(12) United States Patent
Browne et al.

(10) Patent No.: US 7,051,849 B2
(45) Date of Patent: May 30, 2006

(54) MAGNETORHEOLOGICAL FLUID DAMPER

(75) Inventors: Alan Lampe Browne, Grosse Pointe, MI (US); Nancy L. Johnson, Northville, MI (US); Chandra Sekhar Namuduri, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/691,365

(22) Filed: Oct. 22, 2003

(65) Prior Publication Data

US 2005/0087409 A1   Apr. 28, 2005

(51) Int. Cl.
*F16F 15/03* (2006.01)

(52) U.S. Cl. .................... 188/267; 188/266.4; 188/268

(58) Field of Classification Search ............. 188/267.1, 188/267, 267.2, 266.4, 266.7, 269, 268; 267/140.14
See application file for complete search history.

(56) References Cited

U.S. PATENT DOCUMENTS

| | | | |
|---|---|---|---|
| 2,856,179 A | 10/1958 | Hogan | |
| 4,351,515 A | 9/1982 | Yoshida | |
| 4,673,067 A * | 6/1987 | Munning et al. | 188/266.4 |
| 4,679,775 A | 7/1987 | Funaki et al. | |
| 4,896,754 A | 1/1990 | Carlson et al. | |
| 4,925,409 A | 5/1990 | Johnson | |
| 4,938,322 A | 7/1990 | Sugasawara | |
| 4,942,947 A | 7/1990 | Shtarkman | |
| 5,018,606 A * | 5/1991 | Carlson | 188/267.1 |
| 5,099,884 A * | 3/1992 | Monahan | 267/140.14 |
| 5,336,048 A | 8/1994 | Ganzon et al. | |
| 5,492,312 A | 2/1996 | Carlson | |
| 5,525,249 A | 6/1996 | Kordonsky et al. | |
| 5,573,088 A * | 11/1996 | Daniels | 188/267 |
| 5,900,184 A | 5/1999 | Weiss et al. | |
| 5,944,151 A | 8/1999 | Jakobs et al. | |
| 5,944,152 A | 8/1999 | Lindsay et al. | |
| 5,947,238 A | 9/1999 | Jolly et al. | |
| 5,992,582 A | 11/1999 | Lon et al. | |
| 6,095,486 A | 8/2000 | Ivers et al. | |
| 6,202,806 B1 * | 3/2001 | Sandrin et al. | 188/267.1 |
| 6,260,675 B1 * | 7/2001 | Muhlenkamp | 188/267 |
| 6,279,700 B1 | 8/2001 | Lisenker et al. | |
| 6,279,701 B1 * | 8/2001 | Namuduri et al. | 188/267.2 |
| 6,302,249 B1 | 10/2001 | Jolly et al. | |
| 6,327,024 B1 | 12/2001 | Hayashi et al. | |
| 6,380,253 B1 | 4/2002 | Das | |
| 6,394,239 B1 | 5/2002 | Carlson | |
| 6,427,813 B1 | 8/2002 | Carlson | |
| 6,471,018 B1 | 10/2002 | Gordaninejad et al. | |
| 6,571,161 B1 | 5/2003 | Browne et al. | |
| 6,601,915 B1 | 8/2003 | Sullivan et al. | |

(Continued)

FOREIGN PATENT DOCUMENTS

GB 2384217 7/2003

*Primary Examiner*—Melanie Torres
(74) *Attorney, Agent, or Firm*—Kathryn A. Marra

(57) ABSTRACT

A magnetorheological damper device is provided having an increased shear interface area per unit volume of the device, which enhances the stroking force of the damper. The damper generally includes a cylindrically shaped housing; a magnetorheological fluid disposed in the cylindrically shaped housing; a piston assembly disposed within the cylindrically shaped housing in sliding engagement with the cylindrically shaped housing defining a first chamber and a second chamber, wherein the piston assembly comprises a plurality of cylindrically shaped fluid passageways extending from the first chamber to the second chamber, and an electromagnet; and a power supply in electrical communication with the electromagnet.

12 Claims, 4 Drawing Sheets

U.S. PATENT DOCUMENTS

| | | |
|---|---|---|
| 6,681,905 B1 | 1/2004 | Edmondson et al. |
| 6,836,717 B1 | 12/2004 | Buechele et al. |
| 2002/0113424 A1 | 8/2002 | Smith, Jr. et al. |
| 2002/0185347 A1 | 12/2002 | Pohl et al. |
| 2003/0001372 A1 | 1/2003 | Browne et al. |
| 2003/0113160 A1 | 6/2003 | Welch et al. |
| 2004/0173422 A1* | 9/2004 | Deshmukh et al. ...... 188/267.2 |
| 2004/0182661 A1* | 9/2004 | Lun ........................ 188/267.2 |

* cited by examiner

MAGNETORHEOLOGICAL FLUID DAMPER

BACKGROUND

This disclosure generally relates to a magnetorheological fluid damper and more particularly, to a magnetorheological fluid damper providing an increased shear interface area per unit volume and/or mass of the damping device.

Magnetorheological (MR) fluids belong to a class of controllable fluids. The essential characteristic of these fluids is their ability to reversibly change from a free-flowing, linear, viscous liquid to a semi-solid with a controllable yield strength in milliseconds when exposed to a magnetic field. In the absence of an applied field, MR fluids are reasonably well approximated as Newtonian liquids.

A typical MR fluid has about 20 to about 40 percent by volume of relatively pure, soft iron particles, typically about 3 to about 5 microns, suspended in a carrier liquid such as mineral oil, synthetic oil, water, or glycol. A variety of proprietary additives similar to those found in commercial lubricants are commonly added to discourage gravitational settling and promote particle suspension, enhance lubricity, modify viscosity, and inhibit wear. The ultimate strength of the MR fluid depends on the square of the saturation magnetization of the suspended particles.

MR fluids made from iron particles typically exhibit maximum yield strengths of 30–90 kPa for applied magnetic fields of 150–250 kA/m (1 Oe·80 A/m). MR fluids are not highly sensitive to moisture or other contaminants that might be encountered during manufacture and use. Furthermore, because the magnetic polarization mechanism is not affected by the surface chemistry of surfactants and additives, it is a relatively straightforward matter to stabilize MR fluids against particle-liquid separation in spite of the large density mismatch.

Most devices employ MR fluids in a valve mode, direct-shear mode, or combination of these two modes. Examples of valve mode devices include servovalves, dampers, and shock absorbers. Examples of direct-shear mode devices include clutches, brakes, and variable friction dampers. The maximum stroking force that an MR damper can provide generally depends on the MR fluid properties, the flow pattern, and the size of the damper.

However, the range of stroking forces achievable with current MR materials, flow patterns, and damper geometries are not sufficient for these devices to be practical for some applications such as, for example, crash management applications. For some applications, an increased shear interface per unit volume is desirable since it directly increases the available stroking force.

BRIEF SUMMARY

Disclosed herein is a magnetorheological damper comprising a cylindrically shaped housing; a magnetorheological fluid disposed in the cylindrically shaped housing; a piston assembly disposed within the cylindrically shaped housing in sliding engagement with the cylindrically shaped housing defining a first chamber and a second chamber, wherein the piston assembly comprises a plurality of cylindrically shaped fluid passageways extending from the first chamber to the second chamber, and at least one electromagnet; and a power supply in electrical communication with the electromagnet.

In another embodiment, the magnetorheological damper comprises a cylindrically shaped housing; a magnetorheological fluid disposed in the cylindrically shaped housing; a piston assembly disposed within the cylindrically shaped housing in sliding engagement with the cylindrically shaped housing defining a first chamber and a second chamber, wherein the piston assembly comprises an open cell porous media comprising a plurality of fluid passageways extending from the first chamber to the second chamber, and at least one electromagnet centrally disposed in the piston assembly; and a power supply in electrical communication with the electromagnet.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein is a magnetorheological fluid damper, also referred to herein as an MR damper. The MR damper is especially suitable for use in applications desiring damping control, and in a preferred embodiment, employs a design that provides an increase in the shear interface area per unit volume of the device, which enhances the stroking force, thereby overcoming some of the problems noted in the prior art. As will be discussed in greater detail, the MR damper as described herein preferably employs a piston of an open cell porous media to provide multiple fluid passageways. The fluid passageways may or may not be of uniform geometry and size.

It is known that a large turn-up ratio can be obtained with a reduction in off-state force and/or by improving/increasing the initial on-state force. The initial on-state force is generally dependent on the yield stress of the MR fluid, which is primarily dependent on the magnetic flux density in the fluid flow gaps. It has been discovered that by increasing the shear interface area per unit volume provided by the fluid passageways, a large turn-up ratio can be obtained.

Figure 1:
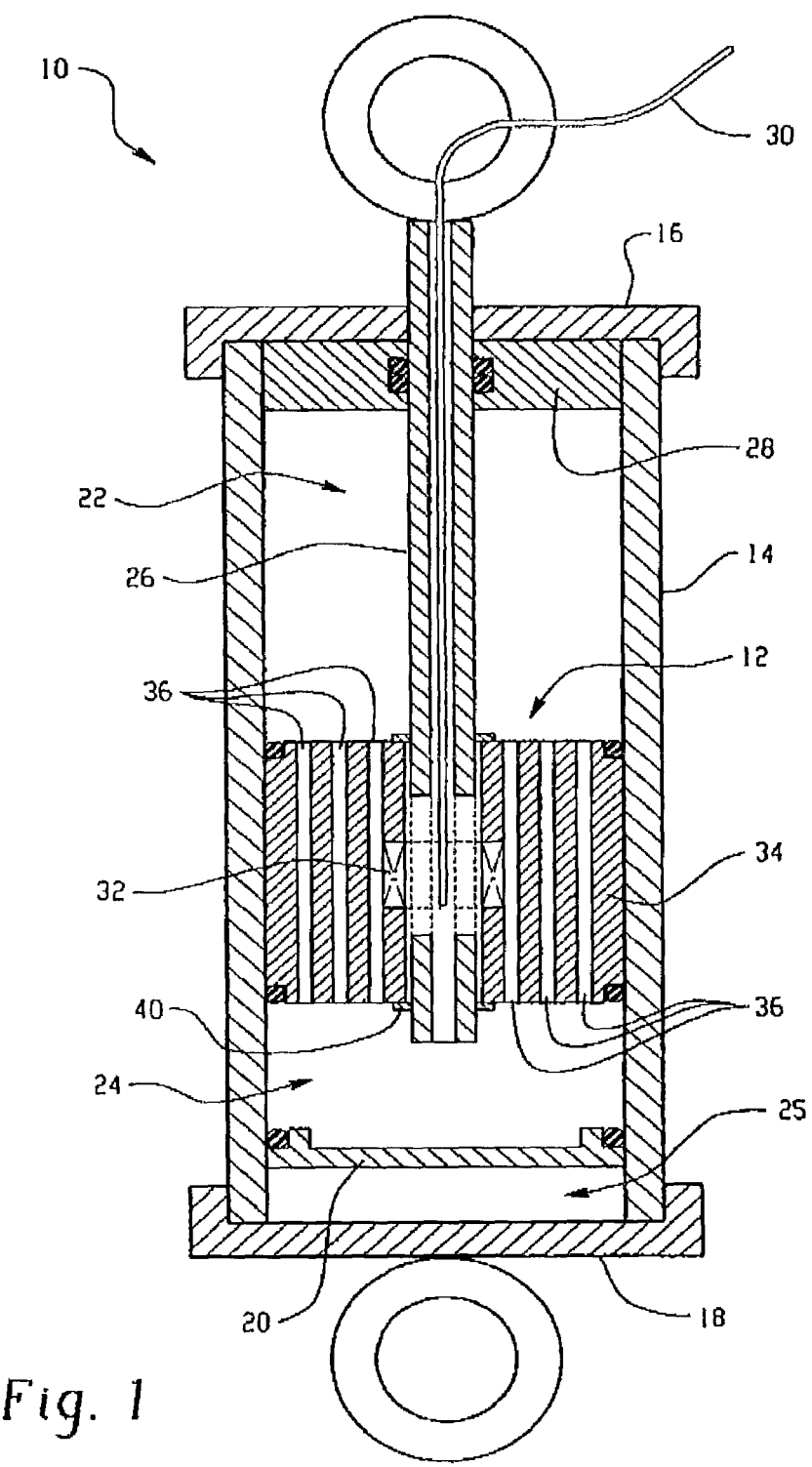
FIG. 1 is a cross sectional view of a magnetorheological damper.

FIG. 1 illustrates a cross section of an exemplary magnetorheological (MR) fluid damper 10 having an increased shear interface area per unit volume of fluid passageways. The MR fluid damper 10 includes a piston assembly generally designated 12 that is slidably engageable within a cylindrically shaped housing 14. The cylindrically shaped housing 14 is sealed at both ends with end caps 16, 18. A floating piston 20 is disposed within the housing 14 proximate to end cap 18. In this manner, the piston assembly 12 defines a first chamber 22 and a second chamber 24, which are both filled with an MR fluid. A third chamber 25, defined by the floating piston 20 and the housing end 18, is filled with an inert gas. As such, the third chamber 25 is separated from the MR fluid. The floating piston 20 and inert gas therein accommodate the varying rod volume during movement of the piston assembly 12.

The piston assembly 12 is attached to a hollow rod 26 that slides within a sealed bearing 28 disposed adjacent to end cap 16. A wire 30 is disposed within an interior region provided by the hollow rod 26. One end of wire 30 is in electrical communication with a coil 32 within the piston assembly 12. The coil 32 is capable of carrying a variable current to generate a magnetic field having a variable and controllable magnetic flux density depending on the magnitude of the current. In this manner, the viscosity and shear properties of the MR fluid disposed within the piston assembly 12 can be controlled. The other end of the wire is in electrical communication with a power supply (not shown) for supplying the current to the coil 32, which can be alternating current or direct current depending on the desired application.

Figure 2:
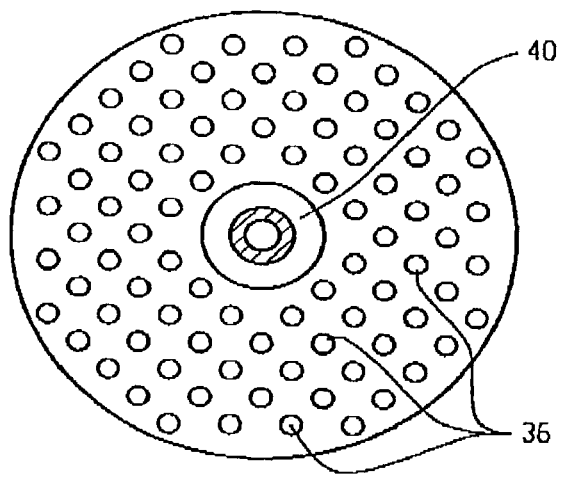
FIG. 2 is an end view of the piston assembly of the MR damper of FIG. 1 in accordance with one embodiment.

A piston bearing 34 is mounted on an annular surface of the piston assembly 12 for permitting smooth sliding contact along a wall of the cylindrically shaped housing 14 while creating a fluidic seal between the first chamber 22 and the second chamber 24. The piston assembly 12 further includes a plurality of non-concentric, non-overlapping, cylindrically shaped bores 36 (i.e., axis parallel to that of the cylinder itself) extending through the piston assembly 12 so as to permit fluid communication of the MR fluid between the first and second chambers 22, 24, respectively. Shown more clearly in FIG. 2, the cylindrically shaped bores 36 have a circular shaped cross section, thereby providing the capability of a significantly greater cross sectional surface area than in previous designs. The size and number of circular flow channels 36 depend on the desired application. In order to maximize the turn-up ratio, it is preferred that the cross sectional area provided by the cylindrically shaped bores 36 represent at least about 30 percent of the available cross sectional area of the piston assembly 12, with greater than about 40 percent more preferred, and with greater than 50 percent even more preferred (the theoretical upper limit being about 78 percent). In practical use, this can probably be no more than 60 percent as the cell walls require a sufficient thickness, i.e., yield strength, to withstand applied loads. The increase in volume provided by the cylindrically shaped bores 36 increases the shear interface value, thereby enhancing the stroking force.

Figure 5:
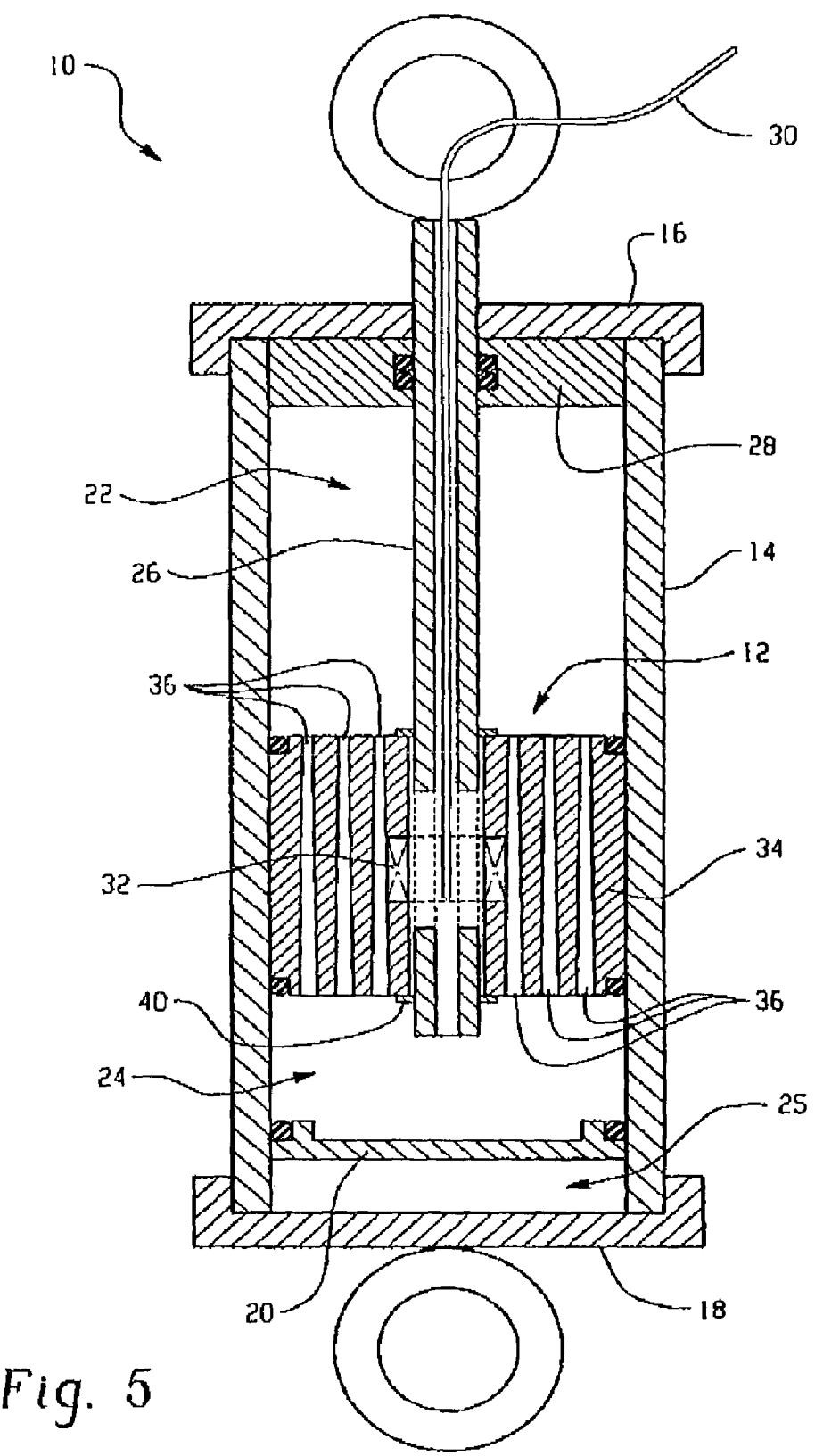
FIG. 5 is a cross sectional view of the magnetorheological damper in accordance with an embodiment.
Figure 6:
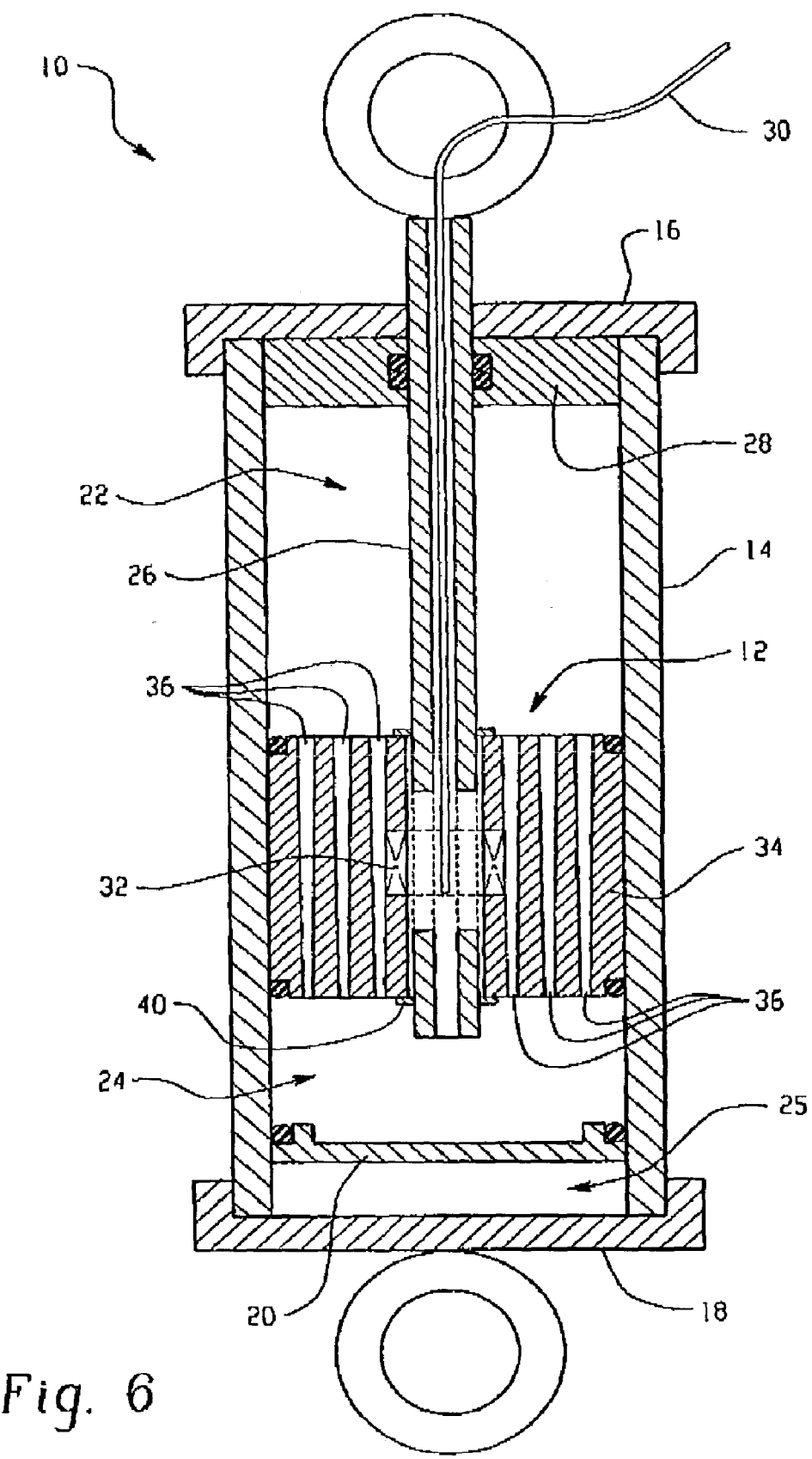
FIG. 6 is a cross sectional view of the magnetorheological damper in accordance with another embodiment.

The cylindrically shaped bores 36 can be formed from a plurality of annular plates or have a one-piece construction. In forming the piston assembly from stackedly arranged annular plates, each plate comprising a plurality of circular openings that are aligned to form the cylindrically shaped bores 36. The cross sectional diameter of the cylindrically shaped bores 36 can be the same or different depending on the desired application. In an alternative embodiment, the bores 36 are not cylindrically shaped and comprise variable diameters, such as for example, a bore having an increasing diameter from the first chamber 22 to the second chamber 24 as shown in FIG. 5 or a bore having an decreasing diameter as it extends from the first chamber 22 to the second chamber 24 as shown in FIG. 6. In this manner, the off-state properties would be directionally oriented. Preferably, the annular plates that form the bores 36 are of a rigid non-magnetic material such as a plastic, stainless steel, aluminum, nickel, and the like.

The piston assembly 12 may further comprise end plates 40 at each end, which are preferably sized to cover the respective end face of piston core 32, without hindering fluid flow through bores 36. The end plates 40 also function to maximize the magnetic filed in the plurality of cylindrically shaped bores 36 by minimizing leakage flux and thereby increasing the initial on-state force by functioning as a magnetic isolation barrier between the piston core 32 and both rod 26 and cylinder 14. As such, end plates 40 are preferably formed from a rigid non-magnetic material.

Figure 3:
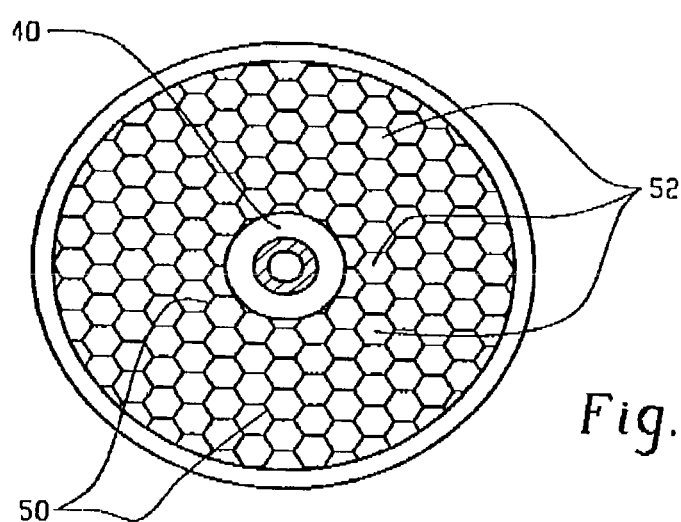
FIG. 3 is an end view of the piston assembly of the MR damper of FIG. 1 in accordance with a second embodiment.

FIG. 3 illustrates another embodiment, wherein the piston assembly includes an open cell porous structure. In this particular embodiment, each cell of the media comprises a honeycomb wall structure 50 having hexagonally shaped openings, although any polygonally shaped opening is contemplated. The spacing between the openings is chosen to withstand the operating pressures and environmental conditions in which the MR fluid damper is operated. Multiple sheets of the honeycomb structure can be stackedly arranged to form the porous flow channels 52 therein or the honeycomb structure can have a one-piece construction. Although a honeycomb structure is depicted, the fluid passageways can comprise any polygon shape. The cell size of each honeycomb is generally dependent on the type of MR fluid and its properties. However, to maximize stroking force for most MR fluid types and applications, the cell opening dimension is preferably less than about 1 millimeter.

Figure 4:
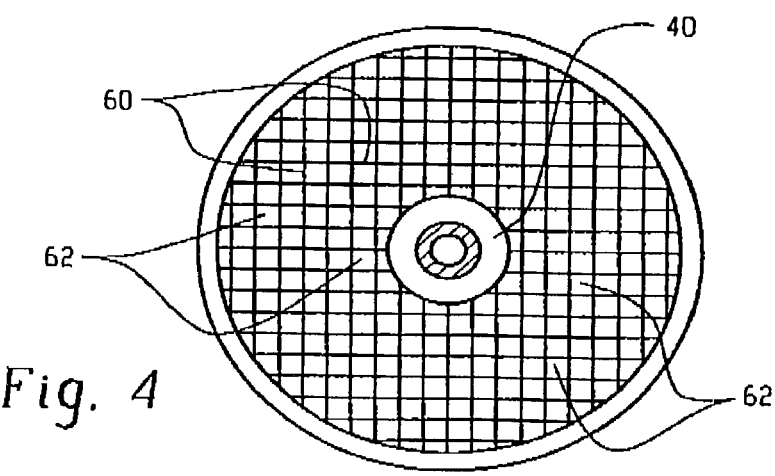
FIG. 4 is an end view of the piston assembly of the MR damper of FIG. 1 in accordance with a third embodiment.

FIG. 4 illustrates yet another open cell porous structure for maximizing stoking force. In this embodiment, a lattice network 60 is employed. Preferably, the lattice network 60 is randomly or ordered rigid non-magnetic material such as a plastic, stainless steel, aluminum, nickel, and the like, and is chosen to withstand the operating pressures and environmental conditions in which the MR fluid damper is operated. The lattice network includes a plurality of interconnected fluid passageways 62 extending from the first chamber 22 to the second chamber 24.

Suitable MR fluid materials include, but are not intended to be limited to, ferromagnetic or paramagnetic particles or particulates dispersed in a carrier fluid. Suitable paramagnetic particles or particulates include compounds comprising oxides, chlorides, sulfates, sulfides, hydrates, and other organic or inorganic compounds of cerium, chromium, cobalt, dysprosium, erbium, europium, gadolinium, holmium, iron, manganese, neodymium, nickel, praesodymium, samarium, terbium, titanium, uranium, vanadium, and yttrium. Preferred particulates include alloys of iron, nickel, manganese, and cobalt, with or without other non-magnetic elements; alloys of iron, nickel, manganese, and cobalt with gadolinium; and the like, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to the magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometer especially preferred. The particles are preferably present in an amount between about 5.0 and about 50 percent by volume of the total composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component is preferably less than or equal to about 100,000 centipoise, with less than or equal to about 10,000 centipoise more preferred, and less than or equal to about 1,000 centipoise even more preferred. Also preferred is a viscosity of greater than or equal to about 1 centipoise, with greater than or equal to about 250 centipoise more preferred, and greater than or equal to about 500 centipoise especially preferred.

Aqueous carrier fluids may also be used, especially those comprising hydrophilic mineral clays such as bentonite and hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

The preferred particulates are nanoparticles. Suitable diameter sizes for the particulates can be less than or equal to about 500 nanometers, with less than or equal to about 250 nanometers preferred, and less than or equal to about 100 nanometers more preferred. Also preferred is a particulate diameter of greater than or equal to about 1.0 nanometer, with greater than or equal to about 10 nanometers more preferred, and greater than or equal to about 50 nanometers especially preferred. The particulates preferably have an aspect ratio of about 0.25 to about 4, where the aspect ratio is defined as the ratio of the length to the equivalent circular diameter. The particulates are preferably present in an amount between about 5 to about 50 percent by volume of the total MR composition. Alternatively, the particles can be larger, e.g., micron sized particles, to be effective in altering the modulus properties of the, material in a magnetic field. However, the nanometer-sized particles are more preferred because the modulus properties can be more readily tailored by the choice of particle size, particle size distribution and particle concentration when the nanometer-sized particles are used.

Suitable magnetic field strengths generated by coil 32 or alternative a permanent magnet may range from greater than about 0 to about 1 Tesla (T).

During damping, the MR fluid present in one of the chambers 22, or 24 flows through the plurality of openings provided by the various embodiments disclosed herein. The electric current to the coil 32 is variably controlled to vary the magnetic field and the magnetic flux in the fluid passageways 36, 52, or 62 so as to control the flow characteristics of the MR fluid to achieve a desired damping effect for a given application. The magnetic field, which is perpendicular to the fluid flow, is generated by the small electromagnet in the piston assembly. Importantly, the plurality of the fluid passageways 36, 52, or 62 function to provide an increased damping force when the damper is in the on-state, thereby providing an enhanced turn-up ratio while permitting tuning of the force velocity damping characteristics, thereby optimizing damping and providing exceptional control of, for example, vehicle crash management applications.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A magnetorheological damper, the damper comprising:
a cylindrically shaped housing;
a magnetorheological fluid disposed in the cylindrically shaped housing;
a piston assembly disposed within the cylindrically shaped housing in sliding engagement with the cylindrically shaped housing defining a first chamber and a second chamber, wherein the piston assembly comprises a plurality of cylindrically shaped fluid passageways extending from the first chamber to the second chamber, and at least one electromagnet, wherein the cylindrically shaped fluid passageways are formed from a plurality of annular plates stackedly arranged, wherein each one of the plurality of annular plates comprise a plurality of circular openings that when aligned with the other ones of the plurality of annular plates form the cylindrically shaped fluid passageways; and
a power supply in electrical communication with the at least one electromagnet.

2. The magnetorheological damper of claim 1, wherein the plurality of cylindrically shaped fluid passageways defines a cross sectional area of the piston assembly of at least about 30 to about 70 percent.

3. The magnetorheological damper of claim 1, wherein the cylindrically shaped fluid passageway has a diameter that increases from the first chamber to the second chamber.

4. The magnetorheological damper of claim 1, wherein the cylindrically shaped fluid passageway has a diameter that decreases from the first chamber to the second chamber.

5. The magnetorheological damper of claim 1, further comprising a third chamber defined by a second floating piston and an end of the housing, wherein the third chamber is filled with an inert gas.

6. A magnetorheological damper, the damper comprising:
a cylindrically shaped housing;
a magnetorheological fluid disposed in the cylindrically shaped housing;
a piston assembly disposed within the cylindrically shaped housing in sliding engagement with the cylindrically shaped housing defining a first chamber and a second chamber, wherein the piston assembly comprises an open cell porous media comprising a plurality of fluid passageways in fluid communication with a plurality of opening in a top surface and in a bottom surface of the piston assembly, and at least one electromagnet centrally disposed in the piston assembly; and
a power supply in electrical communication with the at least one electromagnet.

7. The magnetorheological damper of claim 6, wherein the fluid passageways have circular or polygon shaped cross sectional openings.

8. The magnetorheological damper of claim 6, wherein the open cell porous media comprises a plurality of stackedly arranged sheets, wherein each sheet of the plurality of stackedly arranged sheets is a rigid lattice network of nonmetallic material having hexagonally shaped openings.

9. The magnetorheological damper of claim 6, wherein the fluid passageways formed in the open cell porous media have a cross sectional area of about 30 to about 70 percent.

10. The magnetorheological damper of claim 6, wherein the open cell porous media comprises a rigid foam comprising a plurality of irregularly shaped fluid passageways extending from the first chamber to the second chamber.

11. The magnetorheological damper of claim 6, wherein the fluid passageways have different size and/or shaped openings.

12. The magnetorheological damper of claim 6, further comprising a third chamber defined by a floating piston and an end of the housing, wherein the third chamber is filled with an inert gas.

* * * * *